(12) United States Patent
Takamisawa et al.

(10) Patent No.: US 9,486,749 B2
(45) Date of Patent: Nov. 8, 2016

(54) METHOD FOR PRODUCING MIXED GAS AND GAS MIXING DEVICE

(71) Applicant: NISSAN TANAKA CORPORATION, Miyoshi-machi, Iruma-gun, Saitama (JP)

(72) Inventors: Kazuhiko Takamisawa, Nagano (JP); Takashi Miyoshi, Ueda (JP)

(73) Assignee: Nissan Tanaka Corporation, Saitama (JP)

( * ) Notice: Subject to any disclaimer, the term of this patent is extended or adjusted under 35 U.S.C. 154(b) by 7 days.

(21) Appl. No.: 14/362,909

(22) PCT Filed: Nov. 20, 2012

(86) PCT No.: PCT/JP2012/080088
§ 371 (c)(1),
(2) Date: Jun. 4, 2014

(87) PCT Pub. No.: WO2013/084716
PCT Pub. Date: Jun. 13, 2013

(65) Prior Publication Data
US 2014/0334246 A1 Nov. 13, 2014

(30) Foreign Application Priority Data

Dec. 6, 2011 (JP) .................................. 2011-266854

(51) Int. Cl.
*B01F 5/04* (2006.01)
*B01F 3/02* (2006.01)
(Continued)

(52) U.S. Cl.
CPC ................. *B01F 3/028* (2013.01); *B01F 5/04* (2013.01); *B01F 15/0408* (2013.01); *G05D 11/131* (2013.01)

(58) Field of Classification Search
CPC .......... B01F 3/02; B01F 3/026; B01F 3/028; B01F 5/04

USPC ...................................................... 366/162.1
See application file for complete search history.

(56) References Cited

U.S. PATENT DOCUMENTS 4,549,563 A 10/1985 Monnier
5,435,332 A * 7/1995 Heinonen ............... B01F 3/028
137/3

FOREIGN PATENT DOCUMENTS

CN 101914696 A 12/2010
JP 46-005422 Y 2/1971
(Continued)

OTHER PUBLICATIONS

International Search Report in Application No. PCT/JP2012/080088, Japanese Patent Office, mailed Dec. 18, 2012.
(Continued)

*Primary Examiner* — Tony G Soohoo
*Assistant Examiner* — Anshu Bhatia
(74) *Attorney, Agent, or Firm* — Nixon Peabody LLP; Khaled Shami

(57) ABSTRACT

This gas mixing device includes a main gas flow path, an additive gas flow path, a mixing section, and a flow rate control unit. A pilot type pressure regulating unit configured to regulate pressure of a main gas based on a pressure in the additive gas flow path and a mass flow meter configured to detect the flow rate of the main gas flow path are provided on the main gas flow path. An additive gas flow rate regulator configured to regulate a flow rate of an additive gas is provided on the additive gas flow path. The flow rate control unit controls the flow rate of the additive gas using the additive gas flow rate regulator based on a flow rate of the main gas detected by the mass flow meter.

2 Claims, 2 Drawing Sheets

(51) Int. Cl.
B01F 15/04 (2006.01)
G05D 11/13 (2006.01)

(56) References Cited

FOREIGN PATENT DOCUMENTS

| | | | |
|---|---|---|---|
| JP | 49-108664 | A | 10/1974 |
| JP | 57-035739 | U | 2/1982 |
| JP | 57-091731 | A | 6/1982 |
| JP | 59-012744 | A | 1/1984 |
| JP | 59-124551 | U | 8/1984 |
| JP | 61-067748 | U | 5/1986 |
| JP | 61-167435 | A | 7/1986 |
| JP | 62-059621 | B | 12/1987 |
| JP | 63-016050 | U | 2/1988 |
| JP | 03106429 | A | 5/1991 |
| JP | 07-306720 | A | 11/1995 |
| JP | 09-094451 | A | 4/1997 |
| JP | 09-155180 | A | 6/1997 |
| JP | 11-248100 | A | 9/1999 |

OTHER PUBLICATIONS

Japanese Office Action in JP Application No. 2011-266854, mailed Feb. 18, 2014.
Japanese Office Action in JP Application No. 2011-266854, mailed May 7, 2014.
Office Action mailed Apr. 23, 2015 in Application No. CN 201280059764.7.

* cited by examiner

METHOD FOR PRODUCING MIXED GAS AND GAS MIXING DEVICE

CROSS-REFERENCE TO RELATED PATENT APPLICATION

This application is the national stage of International Application No. PCT/JP2012/080088, filed Nov. 20, 2012, entitled, "Method For Producing Mixed Gas And Gas Mixing Device," which claims the benefit of priority of Japanese Patent Application No. 2011-266854, filed Dec. 6, 2011, the contents of which are incorporated herein by reference in their entirety.

TECHNICAL FIELD

The present invention relates to a mixed gas production method and a gas mixing device for generating a mixed gas by adding an additive gas to a main gas.

BACKGROUND ART

In recent years, in the field of gas cutting, for example, a cutting method using hydrogen in place of acetylene gas or propane gas has received attention. When cutting is performed using hydrogen, a small amount of a hydrocarbon gas is added so that a flame is visible.

In this manner, a mixing device using a pressure regulator for equalizing pressures of gases and a flow rate regulating valve for setting each gas at a predetermined ratio by regulating a flow rate when a mixed gas is generated by mixing two types of gases is conventionally known.

In such a conventional gas mixing device, the pressure of each gas is set and regulated by the pressure regulator provided in correspondence with each gas. In general, when a flow rate (used amount) fluctuates, the pressure of the gas passing through each pressure regulator fluctuates. When the used amount of the mixed gas discharged from the gas mixing device increases/decreases and therefore a passing flow rate of each gas increases/decreases, the pressure of each gas set in each pressure regulator may fluctuate with respect to set pressure and a ratio of the gases constituting the mixed gas may deviate from a set value.

In this manner, when the used amount of the mixed gas has increased/decreased, it is necessary to set a mixture ratio to a predetermined ratio by resetting pressures of gases to the same pressure and regulating the flow rate of each gas passing through each flow rate regulating valve again.

Therefore, technology for equalizing pressures of the gases by regulating differential pressure using a differential pressure regulating valve, a pressure balance circuit, or the like or by setting regulated pressure of one gas as pilot pressure using a pilot pressure regulator and controlling a pressure regulator of the other gas to set pressure of the other gas to the same pressure as that of the one gas is disclosed (for example, see Patent Literature 1).

CITATION LIST

Patent Literature

[Patent Literature 1]

Japanese Examined Patent Application, Second Publication No. S62-59621

SUMMARY OF INVENTION

Technical Problem

However, when the differential pressure regulating valve, the pressure balance circuit, or the pilot pressure regulator is used, a circuit configuration of the mixing device becomes complex and much time is consumed to regulate each device. In addition, vibration is likely to occur in each gas.

Therefore, for example, there has been a strong demand for a mixed gas production method and a gas mixing device, which enable a mixed gas to be generated by mixing gases at a predetermined ratio without having to regulate a mixture ratio again by pressure regulation or flow rate regulation even when a used amount of the mixed gas increases/decreases when a hydrocarbon-based gas is added to hydrogen gas.

The present invention has been made in consideration of such circumstances, and an objective of the invention is to provide a mixed gas production method and a gas mixing device which enable a mixed gas in which a main gas and an additive gas are mixed at a predetermined ratio to be stably generated when the mixed gas is generated by mixing the main gas and the additive gas.

Solution to Problem

A first aspect of the present invention is a gas mixing device for generating a mixed gas by mixing a main gas and an additive gas, the gas mixing device including: a main gas flow path to which the main gas is supplied; an additive gas flow path to which the additive gas is supplied; a mixing section to which the main gas flow path and the additive gas flow path are connected and in which the main gas and the additive gas are mixed and the generated mixed gas is exhausted to a mixed gas exhaust port; and a flow rate control unit. Further, a pilot type pressure regulating unit configured to regulate pressure of the main gas in the main gas flow path based on pressure of the additive gas in the additive gas flow path and a main gas flow rate detecting device configured to detect a flow rate of the main gas of which the pressure in the main gas flow path is regulated are provided on the main gas flow path. Further, an additive gas flow rate regulating device configured to regulate a flow rate of the additive gas which flows from the additive gas flow path to the mixing section is provided on the additive gas flow path. Further, the flow rate control unit controls the flow rate of the additive gas, which flows through the mixing section, using the additive gas flow rate regulating device based on the flow rate of the main gas detected by the main gas flow rate detecting device.

A second aspect of the present invention is a mixed gas production method of generating a mixed gas by mixing a main gas and an additive gas, the mixed gas production method including the steps of: supplying the main gas to a main gas flow path and supplying the additive gas to an additive gas flow path; regulating pressure of the main gas flowing through the main gas flow path based on pressure of the additive gas which flows through the additive gas flow path; regulating a flow rate of the additive gas flowing from the additive gas flow path to a mixing section based on a flow rate of the main gas of which pressure in the main gas flow path is regulated; and mixing the main gas and the additive gas at a predetermined ratio in the mixing section.

According to the gas mixing device and the mixed gas production method related to the above-described aspects, the main gas and the additive gas are mixed at predetermined flow rates even when a used amount of the mixed gas increases/decreases. As a result, it is possible to stably produce the mixed gas of the main gas and the additive gas at a predetermined ratio.

In an embodiment of the present invention as will be described later, a gas of a high flow rate, between gases to be mixed in a mixing section, is set as a main gas and a gas of a low flow rate is set as an additive gas. That is, with respect to a mixed gas production amount, the main gas is greater than 50% and less than 100% and the additive gas is greater than 0% and less than 50%.

Advantageous Effects of Invention

According to the gas mixing device and the mixed gas production method related to the above-described aspects, a mixed gas in which a main gas and an additive gas are mixed at a predetermined ratio can be stably produced even when a used amount of the mixed gas increases/decreases. In addition, a device configuration in mixed gas production is simple and easily operable.

DESCRIPTION OF EMBODIMENTS

Hereinafter, an embodiment of the present invention will be described with reference to the drawings.

Figure 1:
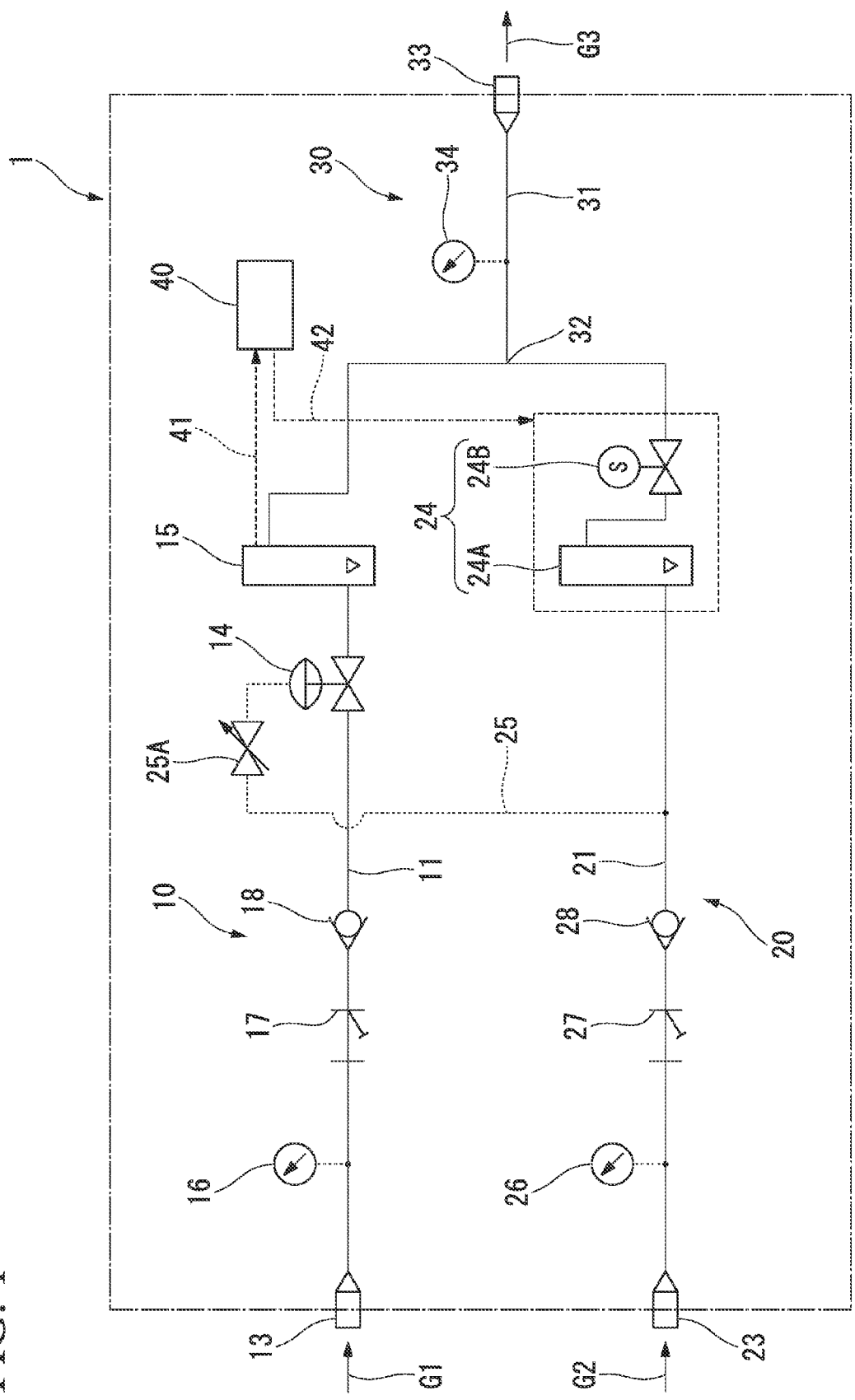
FIG. 1 is a diagram illustrating a schematic configuration of a gas mixing device according to an embodiment of the present invention.

FIG. 1 is a diagram illustrating an outline of a gas mixing device according to the embodiment of the present invention.

The gas mixing device 1 includes a main gas flow path 10, an additive gas flow path 20, a mixed gas flow path 30, a mixing section 32, and a flow rate control unit 40. A mixed gas G3 in which a main gas G1 supplied to the main gas flow path 10 and an additive gas G2 supplied to the additive gas flow path 20 are mixed in the mixing section 32 is generated. The mixed gas G3 is exhausted from a mixed gas exhaust port 33 through the mixed gas flow path 30.

The main gas flow path 10 includes a main gas pipe 11, a main gas supply portion 13, a pressure gauge 16, a filter 17, a check valve 18, a pilot type pressure regulating valve (pilot type pressure regulating unit) 14, and a mass flow meter (main gas flow rate detecting device) 15. The main gas supply port 13, the pressure gauge 16, the filter 17, the check valve 18, the pilot type pressure regulating valve 14, and the mass flow meter 15 are arranged in this order from an upstream side of the main gas pipe 11.

The additive gas flow path 20 includes an additive gas pipe 21, an additive gas supply port 23, a pressure gauge 26, a filter 27, a check valve 28, and an additive gas flow rate regulator (additive gas flow rate regulating device) 24. The additive gas supply port 23, the pressure gauge 26, the filter 27, the check valve 28, and the additive gas flow rate regulator 24 are arranged in this order from an upstream side of the additive gas pipe 21.

The mixed gas flow path 30 includes a mixed gas pipe 31 and a pressure gauge 34. A downstream side of the mixed gas flow path 30 is connected to the mixed gas exhaust port 33.

The upstream side of the mixing section 32 is connected to the main gas flow path 10 and the additive gas flow path 20. The downstream side of the mixing section 32 is connected to the mixed gas flow path 30. The main gas G1 flowing from the main gas flow path 10 and the additive gas G2 flowing from the additive gas flow path 20 are mixed in the mixing section 32. The mixed gas G3 is exhausted from the mixed gas exhaust port 33 via the mixed gas flow path 30.

In addition, the pilot type pressure regulating valve 14, for example, has a pilot pressure side connected to the additive gas flow path 20 via a flow rate regulating valve 25A. Then, the pilot type pressure regulating valve 14 regulates pressure of the main gas G1 in the main gas flow path 10 to the same pressure as that of the additive gas G2 based on the pressure of the additive gas G2 in the additive gas flow path 20. Here, when the additive gas G2 is added to the main gas G1, it is preferable that the pressure of the additive gas G2 be set to be slightly higher than that of the main gas G1. In addition, the pilot type pressure regulating valve 14 has a characteristic that the gas pressure of a side to be regulated is slightly lower than that of the pilot pressure side. Thus, in the pilot type pressure regulating valve 14, the pressure of the main gas G1 is regulated and the additive gas G2 is set to flow to the pilot pressure side.

The mass flow meter 15 is a device configured to measure a flow rate of the main gas G1 which flows from the main gas flow path 10 to the mixing section 32. The measured main gas flow rate is transmitted to the flow rate control unit 40 through a communication line 41.

Based on the flow rate of the main gas G1 transmitted from the mass flow meter 15, the flow rate control unit 40, for example, calculates a flow rate of the additive gas G2, which flows into the mixing section 32, and outputs a flow rate control signal to the additive gas flow rate regulator 24.

The additive gas flow rate regulator 24 includes a flow rate measuring unit 24A and a flow rate regulating valve 24B. The flow rate regulating valve 24B is connected to the flow rate control unit 40 through a communication line 42. An opening of a servo motor is regulated based on the flow rate control signal from the flow rate control unit 40 and therefore the flow rate regulating valve 24B regulates a flow rate of the additive gas G2 which flows from the additive gas flow path 20 to the mixing section 32.

Next, the mixing of the main gas G1 and the additive gas G2 by the gas mixing device 1 will be described.

(1) First, the main gas G1 is supplied to the main gas flow path 10 via the main gas supply port 13 and the additive gas G2 is supplied to the additive gas flow path 20 via the additive gas supply port 23.

(2) Based on the pressure of the additive gas G2 supplied to the additive gas flow path 20, the pressure of the main gas G1 in the main gas flow path 10 is regulated.

(3) The flow rate of the main gas G1, which flows through the main gas flow path 10, is measured by the mass flow meter 15 arranged on the main gas flow path 10.

(4) The flow rate control unit 40 calculates the flow rate of the additive gas G2, which flows from the additive gas flow path to the mixing section 32, based on the flow rate of the main gas G1 measured by the mass flow meter 15. Therefore, based on a result of the calculation, the flow rate control unit 40 calculates an addition amount of the additive gas G2, that is, a flow rate of the additive gas G2, and outputs an additive gas flow rate regulation signal to the flow rate regulating valve 24B of the additive gas flow rate regulator 24.

(5) The opening of the flow rate regulating valve 24B is regulated based on the additive gas flow rate regulation signal output from the flow rate control unit 40, and the additive gas G2, which flows from the additive gas flow path 20 to the mixing section 32, is regulated to a predetermined flow rate.

(6) In the mixing section 32, the main gas G1 and the additive gas G2 are mixed at a predetermined ratio.

According to the gas mixing device 1, the main gas G1 and the additive gas G2 flow into the mixing section 32 at a predetermined ratio even when a used amount of the mixed gas G3 increases/decreases. Therefore, a mixed gas in which the main gas G1 and the additive gas G2 are mixed at the predetermined ratio can be stably produced.

Figure 2:
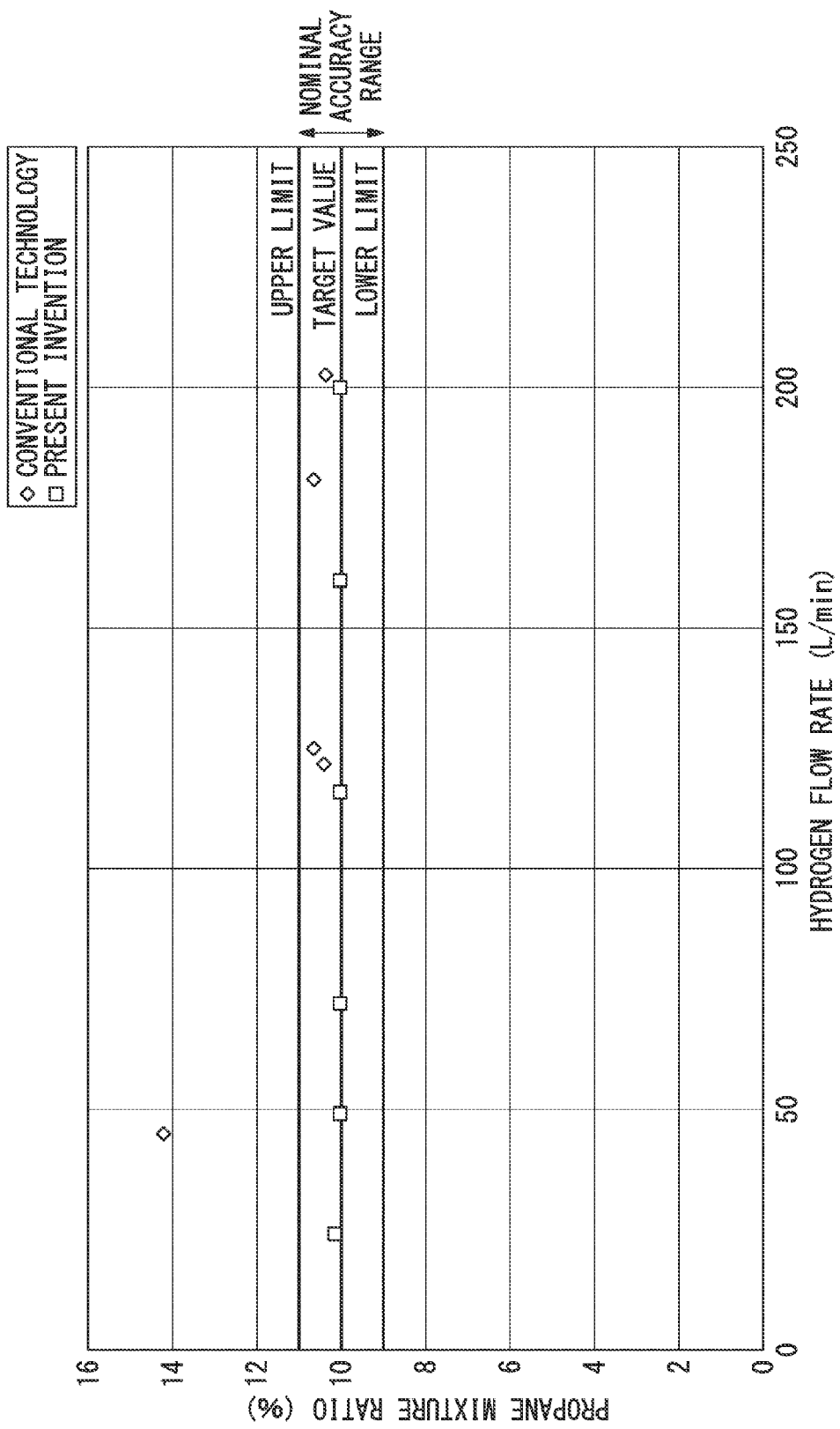
FIG. 2 is a diagram illustrating advantageous effects of the gas mixing device according to an embodiment of the present invention.

In addition, according to the gas mixing device 1, for example, as illustrated in FIG. 2, it is possible to stably produce the mixed gas G3 in which the main gas G1 and the additive gas G2 are mixed at a predetermined ratio without variation even when a used amount (flow rate) of the mixed gas G3 (=main gas G1+additive gas G2) is small.

In addition, if a necessary flow rate is set in a flow rate regulating device of an apparatus using the mixed gas G3, the gas mixing device 1 can supply a mixed gas automatically mixed at a predetermined ratio without regulating any of pressure and a flow rate.

Also, the present invention is not limited to the above-described embodiment, and various changes can be made without departing from the scope of the present invention.

For example, the case in which the main gas G1 is hydrogen and the additive gas G2 is propane gas (a hydrocarbon) has been described in the above-described embodiment. However, a composition of the main gas G1 and the additive gas G2 can be arbitrarily selected from nitrogen, an inert gas, etc. other than hydrogen and a hydrocarbon. In addition, one or both of the main gas G1 and the additive gas G2 may be mixed gases by a plurality of compositions.

INDUSTRIAL APPLICABILITY

According to the above, it is possible to stably mix an additive gas with a main gas at a predetermined ratio.

REFERENCE SIGNS LIST

1 Gas mixing device
10 Main gas flow path
20 Additive gas flow path
14 Pilot type pressure regulating valve (pilot type pressure regulating unit)
15 Mass flow meter (main gas flow rate detecting device)
24 Additive gas flow rate regulator (additive gas flow rate regulating unit)
32 Mixing section
33 Mixed gas exhaust port
40 Flow rate control unit

The invention claimed is:

1. A gas mixing device for generating a mixed gas by mixing a main gas and an additive gas, the gas mixing device comprising:
   a main gas flow path to which the main gas is supplied;
   an additive gas flow path to which the additive gas is supplied;
   a mixing section to which the main gas flow path and the additive gas flow path are connected and in which the main gas and the additive gas are mixed and the generated mixed gas is exhausted to a mixed gas exhaust port;
   a flow rate control unit,
   one pilot type secondary pressure regulating valve provided on the main gas flow path, the pilot type secondary pressure regulating valve includes a primary side connected to the main gas flow path, a pilot pressure side which is a secondary side for pressure control, and a pressure-driven valve body driven by a pressure of the pilot pressure side; and
   a main gas flow rate detecting device provided on the main gas flow path,
   wherein the pilot pressure side of the pilot type secondary pressure regulating valve is connected to the additive gas flow path via a flow rate regulating valve to regulate pressure of the main gas in the main gas flow path by the pressure-driven valve body based on pressure of the additive gas, which flows in the additive gas flow path,
   wherein the main gas flow rate detecting device is configured to detect a flow rate of the main gas of which the pressure in the main gas flow path is regulated,
   wherein an additive gas flow rate regulating device configured to regulate a flow rate of the additive gas which flows from the additive gas flow path to the mixing section is provided on the additive gas flow path, and
   wherein the flow rate control unit controls the flow rate of the additive gas by calculating the flow rate of the additive gas, which flows through the mixing section, based on the flow rate of the main gas transmitted from the main gas flow rate detecting device, generating a control signal based on the calculated flow rate of the additive gas, and outputting the control signal to the additive gas flow rate regulating device.

2. The gas mixing device according to claim 1, wherein pressure of the additive gas flow path is set higher than pressure of the main gas flow path.

* * * * *